United States Patent
Sluder

(10) Patent No.: US 6,978,552 B1
(45) Date of Patent: Dec. 27, 2005

(54) TABLE SAW GAUGE

(76) Inventor: Roy Gene Sluder, 1350 N. Hwy. 107, Greeneville, TN (US) 37743

( * ) Notice: Subject to any disclaimer, the term of this patent is extended or adjusted under 35 U.S.C. 154(b) by 0 days.

(21) Appl. No.: 11/028,363

(22) Filed: Jan. 3, 2005

(51) Int. Cl.⁷ .......................................... B27G 23/00
(52) U.S. Cl. ............................. 33/640; 33/628; 33/833
(58) Field of Search .................. 33/640, 626, 628, 33/630, 633, 634, 832, 833, 501.03, 201, 33/202; 83/522.11, 522.12, 522.15, 522.18, 83/522.19

(56) References Cited

U.S. PATENT DOCUMENTS

| | | | |
|---|---|---|---|
| 3,205,586 A | 9/1965 | Mullen | |
| 3,628,496 A | 12/1971 | Schmitt | |
| 3,645,002 A * | 2/1972 | Hefti | ............................ 33/628 |
| 4,432,141 A | 2/1984 | Marcyan | |
| 4,443,950 A | 4/1984 | Cockeram | |
| 4,622,752 A * | 11/1986 | Harra | ........................... 33/628 |
| 4,754,276 A | 6/1988 | Carlson et al. | |
| 4,776,102 A * | 10/1988 | Carroll | ........................ 33/557 |
| 4,779,354 A | 10/1988 | Hill | |
| 5,121,553 A | 6/1992 | Boerder | |
| 5,491,906 A * | 2/1996 | Reilly | ......................... 33/640 |
| 6,434,852 B1 * | 8/2002 | Tarris et al. | .................. 33/640 |
| 6,593,587 B2 * | 7/2003 | Pease | .................... 250/559.19 |
| 2004/0040169 A1 * | 3/2004 | Davis | ........................... 33/640 |

\* cited by examiner

*Primary Examiner*—R. Alexander Smith

(57) ABSTRACT

A table saw gauge comprising of a non-metallic body positionable on a saw table. The non-metallic body having a rule and stop assembly for determining the saw blade height. Also contained in the non-metallic body are an electrical circuit, a light source and an electrical power source. The stop assembly is set to a preselected height on the rule. The saw blade is adjusted vertically until it makes contact with the stop assembly completing the electrical circuit which illuminates the light source and signals the operator that the saw blade is now set.

8 Claims, 8 Drawing Sheets

TABLE SAW GAUGE

CROSS-REFERENCED TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF INVENTION

This invention generally relates to a gauge and more particularly to a gauge for setting a table saw blade or other attachments to a pre-determined height above a saw table.

BACKGROUND OF THE INVENTION

Table saws are one of the most widely used tools, being used by carpenters, homeowners, and hobbyists. Many table saw operations call for the saw blade to be set at a pre-determined height above the table. This being necessary for the saw to perform an accurate operation.

The settings using the available gauges are not foolproof and can lead to inaccuracy. With some of the present gauges, it is hard to find the highest tooth of the saw blade above the table, which can lead to an inaccurate setting. In some situations the gauge can move and give an inaccurate setting. In presently available gauges the point of contact between the gauge and saw blade is mechanical, making the task of setting the saw blade accurately more difficult.

Therefore, it is the primary object of the present invention to provide a simple and accurate gauge to measure the height above the saw table of any tool capable of being used on the saw arbor.

It is a further object of the present invention to provide a simple and accurate gauge that accurately locates the highest tooth or teeth of a circle saw above the worktable.

It is a further object of the present invention to provide a simple and accurate gauge to locate the highest point of other tools used on the saw arbor, above the table.

It is a further object of the present invention that when the pre-determined height of any tool on the saw arbor is reached a light immediately illuminates.

It is a further object of the present invention that when the pre-determined height of the tool is reached and the light illuminates, the human judgement factor is removed from the process.

It is a further object of the present invention that the electrical power source is self-contained.

Further objects and advantages will become apparent from a consideration of the drawings and ensuing description.

SUMMARY

The present invention comprises of a body with a scale, a stop, and a self-contained electrical circuit with an illuminating device.

DETAILED DESCRIPTION OF DRAWINGS

Figure 1:
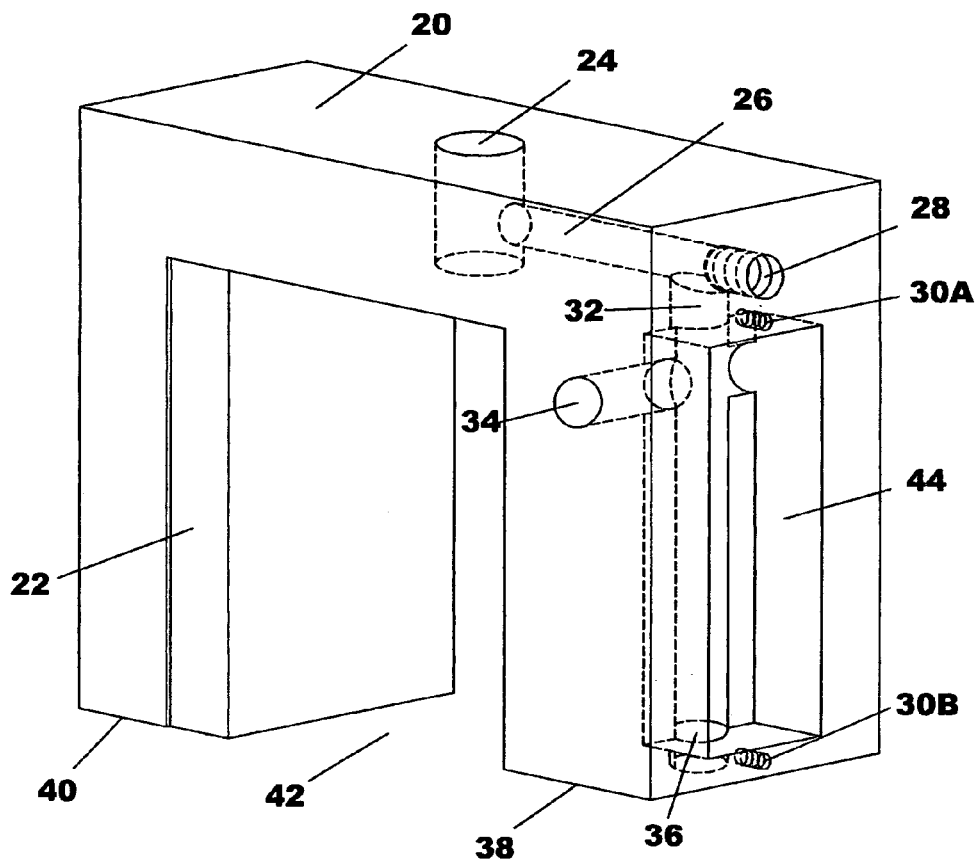
FIG. 1 is a right front perspective view of the body of the invention.

Referring to the drawings and particularly to FIG. 1 thereof, there is shown a non-metallic body 20, consisting of a rule cavity 22, aperture 24, spring aperture 26, threaded hole 28, threaded holes 30a and 30b, aperture 32, light source aperture 34, aperture 36, ground plate mounting surface 38, saw table locating surface 40, stop assembly cavity 42, and cavity 44.

Figure 2:
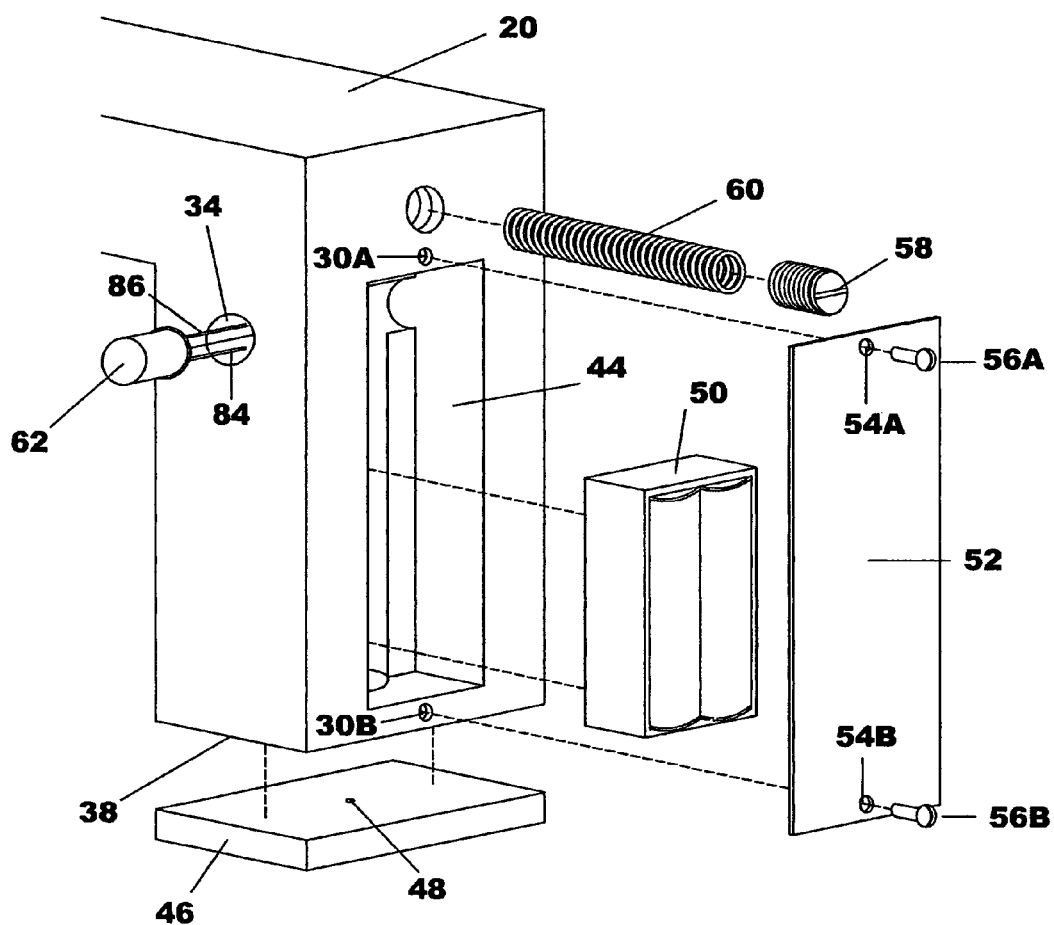
FIG. 2 is a right front perspective view of the invention showing various components.

Referring to FIG. 2 further showing non-metallic body 20, threaded holes 30a and 30b, ground plate mounting surface 38, cavity 44, metallic grounding plate 46, grounding wire aperture 48, electrical power source 50, cover 52, holes 54a and 54b, fasteners 56a and 56b, threaded plug 58, spring 60, and light source 62.

Referring to FIG. 2 further showing non-metallic body 20, and showing by projection lines the assembling of the electrical power source 50 into cavity 44 by the use of industrial adhesive (not shown). Also shown by projection lines is the assembling of the metallic grounding plate 46 to the metallic grounding plate mounting surface 38 by the use of industrial adhesive (not shown). Also shown by projection lines is the assembly of the cover 52 to the non-metallic body 20 by assembling fasteners 56a and 56b thru holes 54a and 54b and into threaded holes 30a and 30b. Light source 62 is assembled into light source aperture 34 and is held in place by an interference fit. This is more clearly seen in FIG. 6. Additionally shown is threaded plug 58 and spring 60, which are shown assembled in FIG. 7. Shown for the purpose of clarity is grounding wire aperture 48.

Figure 3:
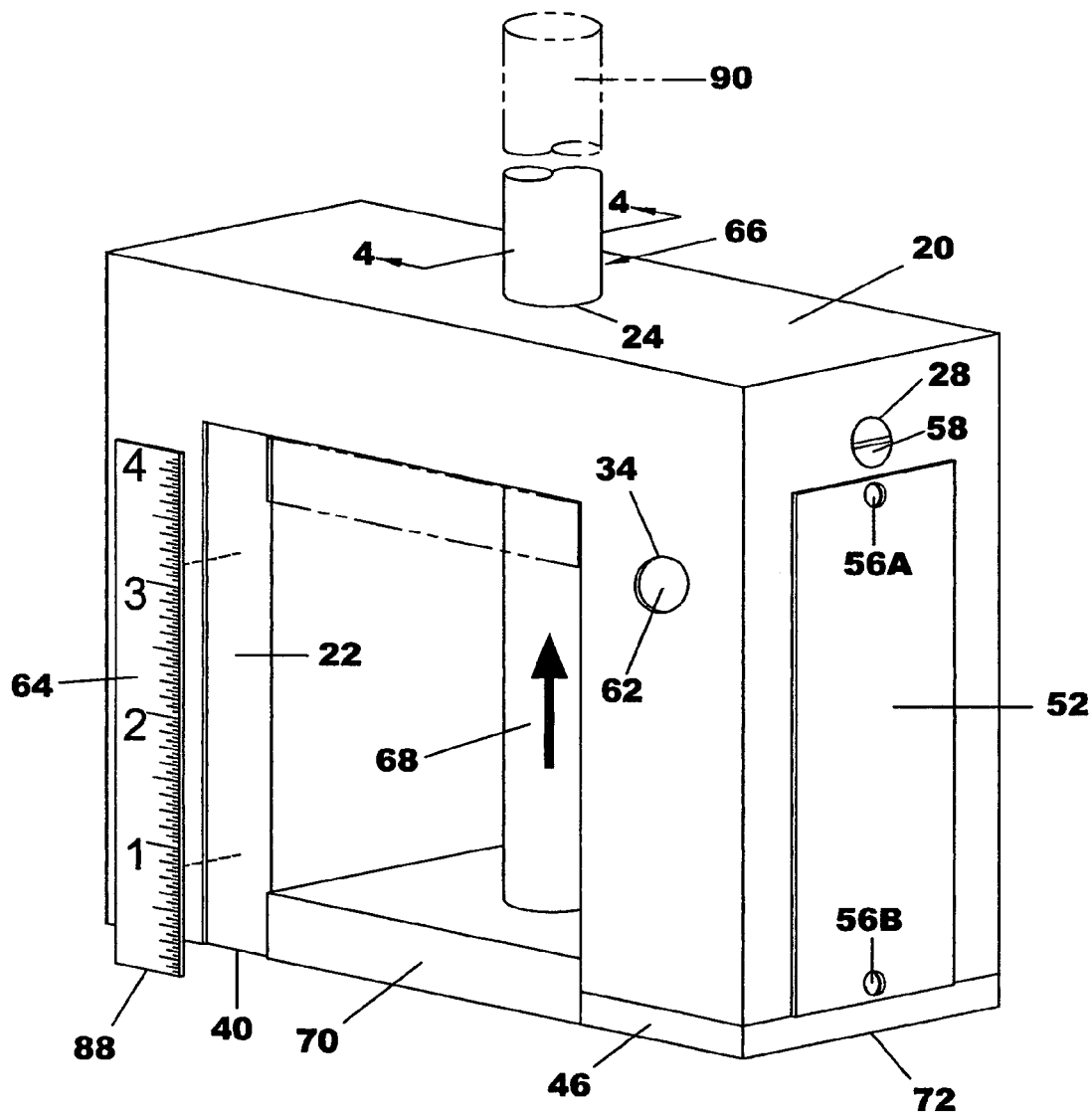
FIG. 3 is a right front perspective view of the invention showing assembly.

Referring to FIG. 3, shown in non-metallic body 20, projection lines showing assembly location of rule 64 which is held in rule cavity 22 by industrial adhesive (not shown). The assembly of rule 64 into rule cavity 22 results in "0" dimension edge 88 of rule 64 being parallel with saw table locating surface 40. Rule 64 may have divisions in fractions, metric, or decimals and can be molded directly into non-metallic body 20, thus eliminating rule 64. Cover 52 is shown in place as described in FIG. 2. Threaded plug 58 is shown assembled in threaded hole 28. Shown for clarity in their proper location are metallic grounding plate 46 and metallic grounding plate horizontal surface 72.

Shown is light source 62 assembled in light source aperture 34 to its proper location. Stop assembly 66, which consists of metallic stop rod 68 and metallic stop block 70, is assembled in aperture 24. Stop assembly 66 is shown to be moveable by the arrow located on metallic stop rod 68 and the alternate position 90 is represented by phantom lines.

Figure 4:
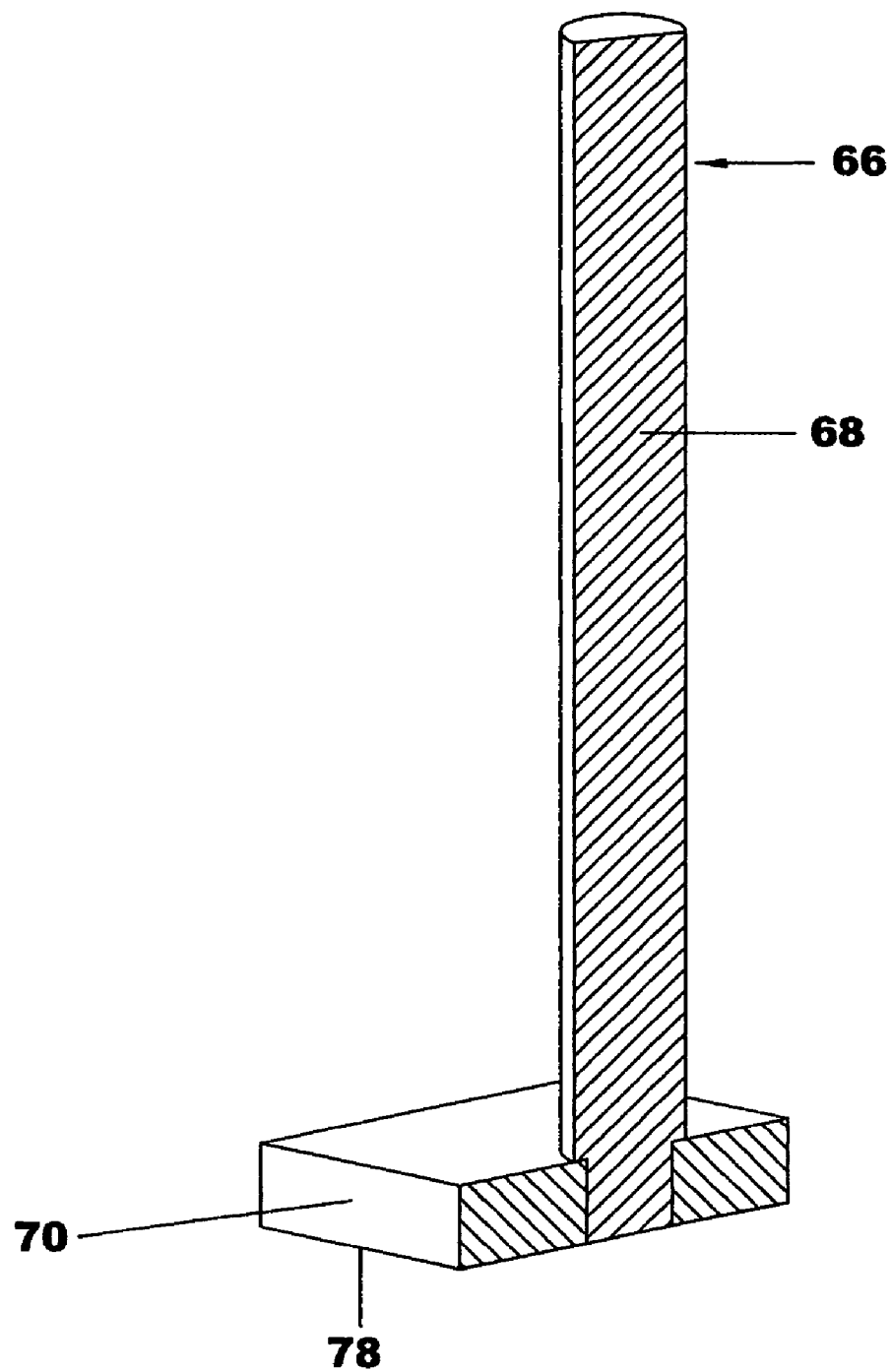
FIG. 4 is a sectional view of the stop assembly 66 from FIG. 3 taken along lines 4—4.

FIG. 4 being a sectional view of stop assembly 66 from FIG. 3, taken along lines 4—4. Stop assembly 66 consisting of metallic stop rod 68 and metallic stop block 70. The metallic stop rod 68 is assembled to metallic stop block 70 by machining metallic stop rod 68 and metallic stop block 70 in such a manner that when assembled together results in an interference fit.

Figure 5:
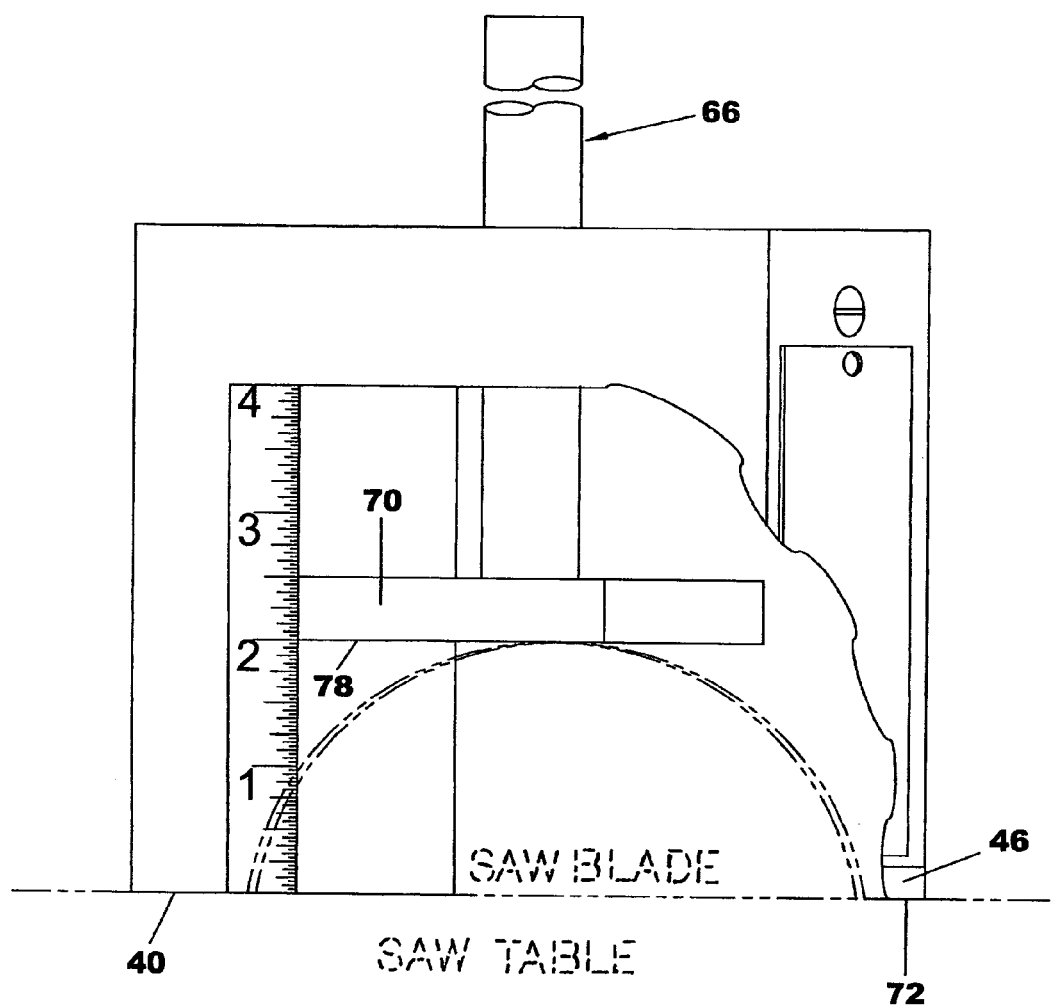
FIG. 5 is a right front perspective view of the invention, with a partial cut-away, sitting on a saw table showing the invention and the saw blade set to a pre-determined height.

FIG. 5 shows the invention in a partial cut-away form properly placed on a saw table with the saw table locating surface 40 and the metallic grounding plate horizontal surface 72 in contact with the saw table. This results in the stop assembly 66 being in a position that causes the saw blade to contact horizontal surface 78 of metallic stop block 70 of stop assembly 66 at the highest point on the saw blade above the saw table.

Figure 6:
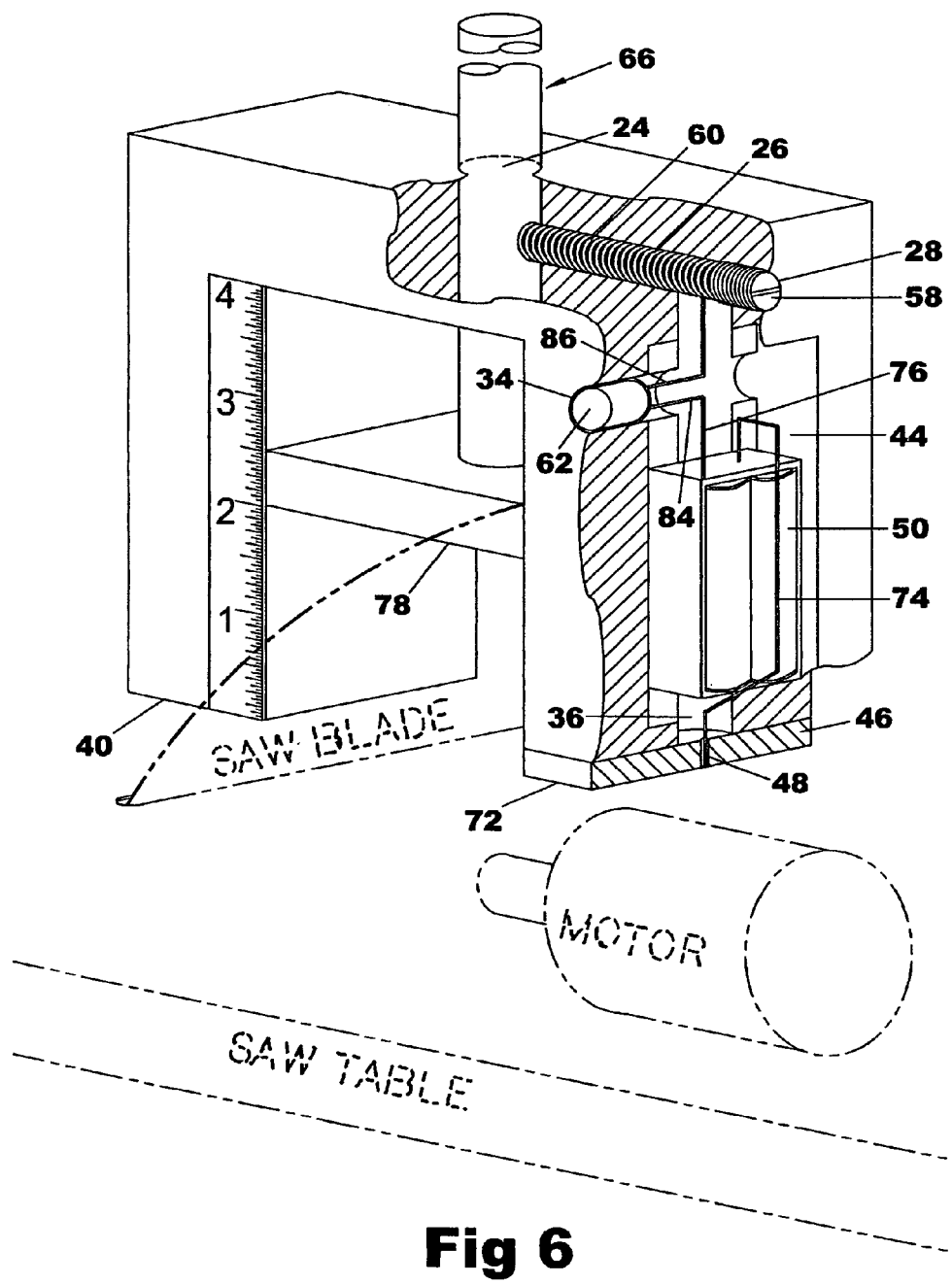
FIG. 6 is a right front perspective partial cut-away view of the invention sitting on a saw table revealing interior structure and components.

Shown in FIG. 6 is the invention sitting in proper location on a saw table. The invention is shown in a partial cut-away form for clarity to better understand the working parts. Shown by partial cut-away is stop assembly 66 assembled in aperture 24 (see FIG. 1). Spring 60 is assembled in spring aperture 26 and held in position by threaded plug 58 being assembled in threaded hole 28. Spring aperture 26 extends into aperture 24 allowing spring 60 to contact stop assembly 66. Further referring to FIG. 6, the partial cut-away showing light source 62, assembled into light source aperture 34. The electrical power source 50 is shown in its proper location in cavity 44. Metallic grounding plate 46 being shown in partial cut-away revealing grounding wire aperture 48. Coming from electrical power source 50 is negative wire 74, which proceeds thru aperture 36 (aperture shown in FIG. 1) and into ground wire aperture 48.

Further referring to FIG. 6, the positive wire 76 goes from the electrical power source 50 to the light source positive wire 84. Referring to the light source negative wire 86, which runs from the light source 62, thru aperture 32 (see FIG. 1) and physically connects to spring 60.

The invention is shown located on a saw table with saw table locating surface 40 and the metallic grounding plate horizontal surface 72 being in contact with the saw table. Further referring to the position of the invention will show it to be centered over the saw blade, the blade being in physical contact with the horizontal surface 78 of the stop assembly 66. In addition to the saw table, the saw blade and the saw motor are shown for clarity.

Figure 7:
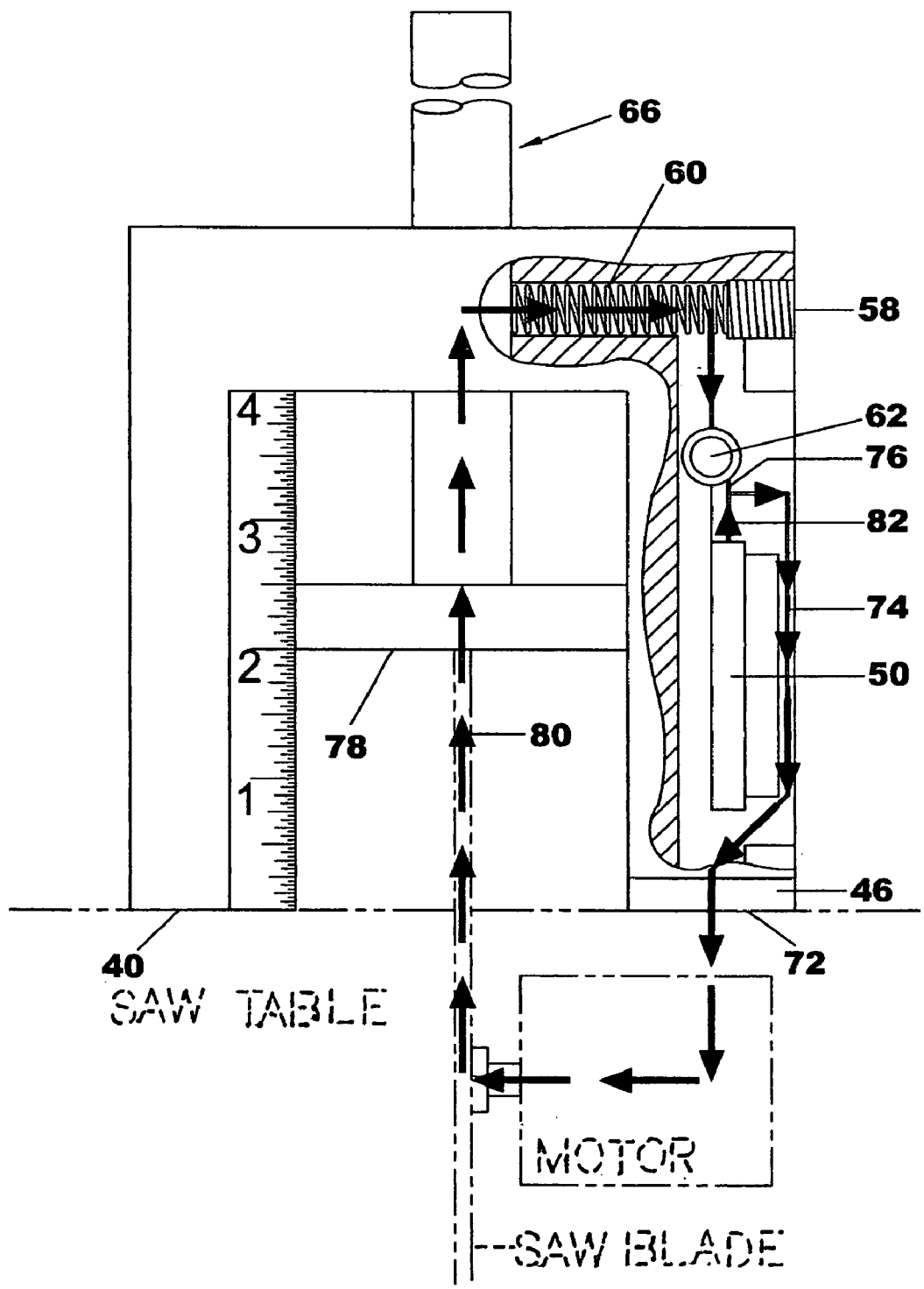
FIG. 7 is a front orthogonal partial cut-away view of the invention sitting on the saw table showing the path of the electric current resulting in the illumination of the light source.

FIG. 7 shows the invention correctly located on a saw table and centered over the saw blade. The invention being located on the saw table by the saw table locating surface 40 and the metallic grounding plate horizontal surface 72. The saw blade being centered under the stop assembly 66 and in physical contact with horizontal surface 78. The negative electrical path 80 originates in the electrical power source 50, flows thru negative wire 74, thru metallic grounding plate 46, thru saw table, motor, saw blade, to the horizontal surface 78 of the stop assembly 66, thru stop assembly 66, thru spring 60, thru light source negative wire 86, to light source 62.

Figure 8:
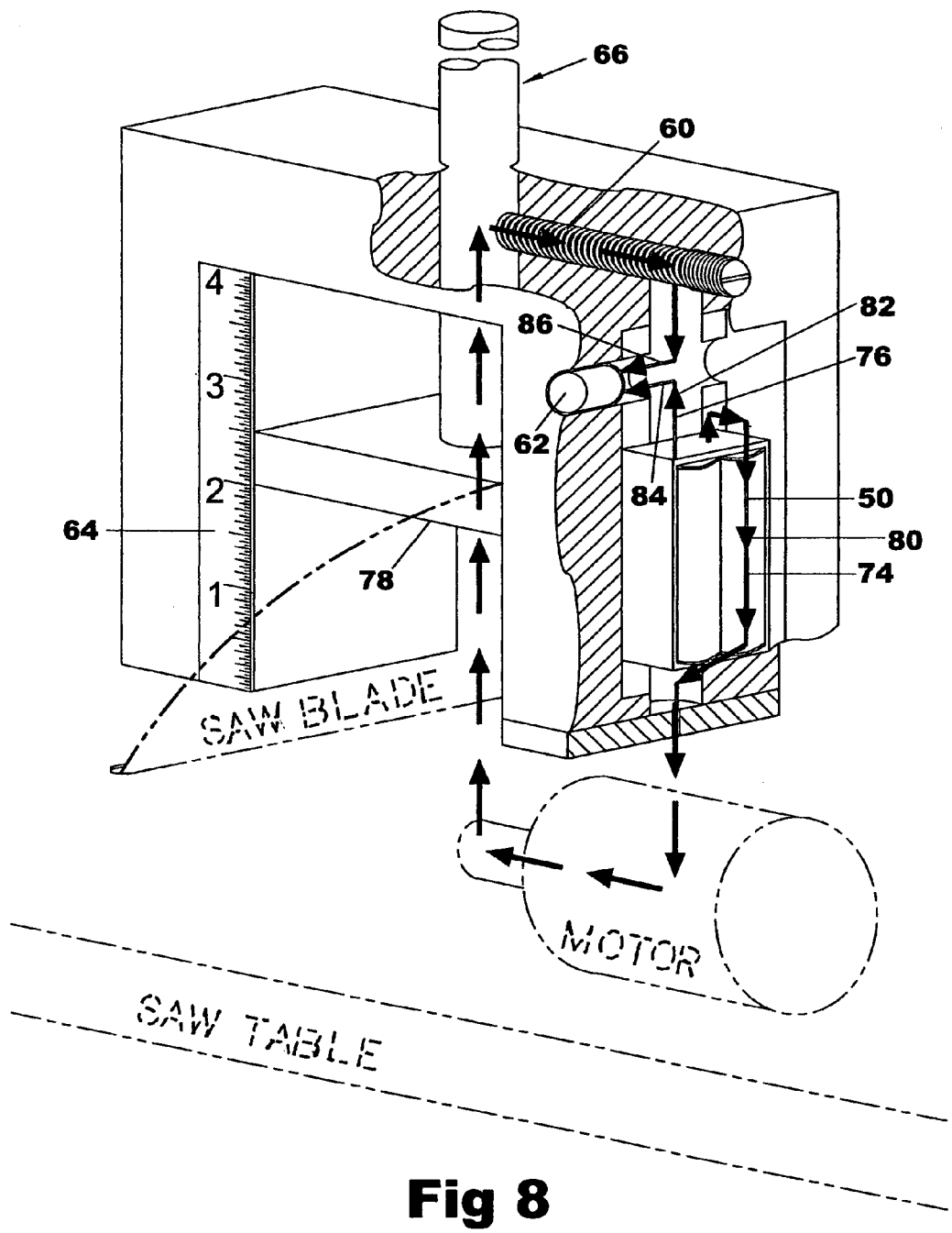
FIG. 8 is a right front perspective partial cut-away view of the invention sitting on a saw table showing the path taken by the electric current to illuminate the lighting source.

Referring to FIG. 8, being a right front perspective view of the invention in the proper location on a saw table, this view, further showing the electrical path from another angle. Shown is the negative electrical path 80 emanating from electrical power source 50, thru negative wire 74, thru metallic grounding plate 46, saw table, motor, and saw blade, the saw blade being in physical contact with horizontal surface 78 of stop assembly 66. This physical contact routes the negative electrical path 80 thru stop assembly 66, to spring 60 and to light source negative wire 86. Emanating from electrical power source 50, thru the positive wire 76 is the positive electrical path 82 and continuing thru the light source positive wire 84, to light source 62.

OPERATION OF THE INVENTION

The use of the table saw gauge being illustrated in the drawings is extremely easy and accurate to use. The operator determines the height the saw blade is to be set above the saw table. The horizontal surface 78 of the stop assembly 66 is moved until it is adjacent to the chosen number on the rule 64. The stop assembly 66 is held in this position by spring 60, which physically contacts stop assembly 66. The spring 60 is held in compression by threaded plug 58, thus creating pressure on stop assembly 66 and holding it in place.

Table saws are equipped with a mechanism to raise and lower the saw blade, which is usually accomplished by the operator turning a handle or some type of mechanical mechanism. At this point the saw blade is lowered until it is below the saw table.

The invention is now placed on the saw table and centered over the saw blade. The saw table locating surface 40 and the metallic grounding plate horizontal surface 72 are now in contract with the saw table.

The operator now raises the saw blade until its highest part contacts the stop assembly 66 and causes the light source 62 to illuminate. The saw blade is now set to the height above the saw table that the operator has chosen.

The invention accomplishes this in the following way:

The metallic plate grounding surface 72, being in contact with the metallic saw table, creates a metallic path for the negative electrical path 80, which originates in the electrical power source 50, thru the negative wire 74, thru the metallic grounding plate 46, thru the saw table, motor, and saw blade, thru the stop assembly 66, spring 60, light source negative wire 86, and light source 62. Simultaneously, a positive electrical path 82 is created by the electrical power source 50 emanating electricity thru positive wire 76, thru light source positive wire 84, and to light source 62.

The instant the saw blade touches the stop assembly 66, the electric circuit is completed resulting in the light source 62 illuminating and telling the operator the table saw is now accurately set to the chosen height above the saw table.

What is claimed is:

1. A table saw gauge used for setting the table saw blade a pre-selected height above the table saw table comprising:
   a non-metallic body having an aperture and a horizontal bottom surface wherein said bottom surface is adapted for engaging the upper surface of the table saw top;
   said non-metallic body having a moveable metallic stop assembly having a metallic stop block with a horizontal surface; said metallic stop assembly having a rod mounted in said aperture wherein said rod is movably held by contact with a spring, said spring being held in a state of compression;
   said non-metallic body having a metallic grounding plate with an under surface adapted to engage the upper surface of the saw table top;
   said non-metallic body comprising an electrical circuit including a power source, a light source, said metallic stop block, said metallic grounding plate and electrical conduction means connecting the power source, the light source, the metallic stop block and the metallic grounding plate;

said electrical circuit being adapted so that a circuit may be formed with a table saw blade so that the table saw gauge can indicate a height of a table saw blade;

said non-metallic body including a rule for measuring the height of the moveable metallic stop assembly.

2. The table saw gauge of claim 1 wherein a threaded plug holds said spring in said compression.

3. The table saw gauge of claim 1 wherein the rule is molded into the non-metallic body.

4. The table saw gauge of claim 1 wherein the rule is attached to the non-metallic body.

5. The table saw gauge of claim 1 wherein the spring and the rod are electrically conductive and are part of the electrical circuit.

6. The table saw gauge of claim 1 wherein the horizontal surface of the metallic stop block is moveable into horizontal alignment with a pre-selected dimension on said rule.

7. The table saw gauge of claim 6 wherein the light source is adapted to illuminate when a height of a table saw blade is set to the pre-selected dimension.

8. The table saw gauge of claim 6 wherein the light source is adapted to illuminate when a part of a table saw blade touches said horizontal surface of the metallic stop block and completes the electrical circuit.

\* \* \* \* \*